US010144558B2

(12) United States Patent
Naumann et al.

(10) Patent No.: US 10,144,558 B2
(45) Date of Patent: Dec. 4, 2018

(54) CONTAINER

(71) Applicant: Eaton Protection Systems IP GmbH & Co. KG, Schönefeld (DE)

(72) Inventors: Reiner Naumann, Mannheim (DE); Dieter Sauer, Heddesbach (DE)

(73) Assignee: EATON PROTECTION SYSTEMS IP GMBH & CO. KG, Schonefeld (DE)

( * ) Notice: Subject to any disclaimer, the term of this patent is extended or adjusted under 35 U.S.C. 154(b) by 86 days.

(21) Appl. No.: 15/100,261

(22) PCT Filed: Nov. 26, 2014

(86) PCT No.: PCT/EP2014/003161
§ 371 (c)(1),
(2) Date: May 27, 2016

(87) PCT Pub. No.: WO2015/078584
PCT Pub. Date: Jun. 4, 2015

(65) Prior Publication Data
US 2017/0001768 A1    Jan. 5, 2017

(30) Foreign Application Priority Data
Nov. 29, 2013   (DE) .................. 10 2013 018 119

(51) Int. Cl.
*B65D 43/16*  (2006.01)
*E05D 3/02*   (2006.01)
(Continued)

(52) U.S. Cl.
CPC .......... *B65D 43/167* (2013.01); *E05D 3/022* (2013.01); *E05D 7/12* (2013.01); *H02G 3/085* (2013.01);
(Continued)

(58) Field of Classification Search
CPC ......... B65D 43/167; E05D 7/12; E05D 3/022; E05D 2007/128; E05D 7/009;
(Continued)

(56) References Cited

U.S. PATENT DOCUMENTS 3,962,750 A * 6/1976 Buss ..................... E05D 3/02
                                                     16/381
4,424,606 A * 1/1984 Sorimachi ........... E05F 1/1261
                                                     16/223

(Continued)

FOREIGN PATENT DOCUMENTS

DE    102006052723    5/2008
DE    202007004768    8/2008
(Continued)

OTHER PUBLICATIONS

Rieutort, Alain, International Search Report issued in International Patent Application PCT/EP2014/003161, completion date Feb. 16, 2015, dated Feb. 24, 2015, 4 pages, European Patent Office.

(Continued)

*Primary Examiner* — James N Smalley
(74) *Attorney, Agent, or Firm* — King & Spalding LLP

(57) ABSTRACT

The invention pertains to a container (1) with at least a box-shaped lower part (2) and a lid part (6) both connected by a pivoting means (3) such that the lid part is pivotable between a closed position (5) and an open position (4). The pivoting means (3) comprises a first bolt (7) assigned to the lid part (6) and a second bolt (8) assigned to the lower part (2), which bolts are pivotally connected to each other, wherein the second bolt (8) is slidably supported in longitudinal direction in the lower part (2) between an inserted position and an extracted position, and where in particular the second bolt (8) is slidable in longitudinal direction in a receiving sleeve (9) between said inserted and extracted positions, which receiving sleeve (9) is supported in the (Continued)

lower part (2) to be releasable from the side of the lid part (6).

19 Claims, 2 Drawing Sheets

(51) Int. Cl.
    *H02G 3/08*     (2006.01)
    *E05D 7/12*     (2006.01)
    *E05D 7/00*     (2006.01)
    *E05D 7/04*     (2006.01)

(52) U.S. Cl.
    CPC ................ *E05D 2007/0072* (2013.01); *E05D 2007/0438* (2013.01); *E05D 2007/0453* (2013.01); *E05D 2007/128* (2013.01); *E05Y 2201/474* (2013.01); *E05Y 2900/602* (2013.01)

(58) Field of Classification Search
    CPC .......... E05D 7/0045; E05D 2007/0072; E05D 7/0415; E05D 7/0423; E05D 2007/0438; E05D 2007/0446; E05D 2007/0453; E05D 2007/0461; E05D 2007/0484; H02G 3/085; E05Y 2201/474; E05Y 2900/602
    USPC .......... 220/230, 810, 811, 831, 832; 16/235, 16/242, 245, 246
    See application file for complete search history.

(56) References Cited

U.S. PATENT DOCUMENTS

| | | | |
|---|---|---|---|
| 2002/0130128 A1* | 9/2002 | Berglund | B65D 43/167 220/230 |
| 2006/0027589 A1* | 2/2006 | Metzdorf | B65D 43/167 220/811 |
| 2007/0240282 A1* | 10/2007 | Nishida | E05D 7/12 16/223 |
| 2015/0318678 A1* | 11/2015 | Ketterer | H05K 5/0226 220/3.8 |

FOREIGN PATENT DOCUMENTS

| | | | |
|---|---|---|---|
| FR | 2099120 | 3/1972 | |
| GB | 2069592 A * | 8/1981 | ............... E05D 5/02 |

OTHER PUBLICATIONS

Machine Translation of DE 102006052723, via LexsisNexis Total Patent, 10 pages.
Machine Translation of FR 2099120, via LexsisNexis Total Patent, 5 pages.
Machine Translation of DE 202007004768, via LexsisNexis Total Patent, 6 pages.

* cited by examiner

CONTAINER

PRIORITY CLAIM

The present application is national phase application of and claims priority to International Application No. PCT/EP2014/003161 with an International filing date of Nov. 26, 2014, which claims priority to German Patent Application No. 10 2013 018 119.4, filed on Nov. 29, 2013. The foregoing applications are hereby incorporated herein by reference.

TECHNICAL FIELD

The invention concerns a container with at least one box-shaped lower part and one lid part connected to the lower part by a pivoting means to be pivotable between a closed position and an open position. The pivoting means comprises a first bolt assigned to the lid part and a second bolt assigned to the lower part, which bolts are pivotally connected to each other. The second bolt is moveably supported in the lower part in longitudinal direction between an insert and an extracted position.

BACKGROUND

Such a container or housing is known from DE 10 2006 052 723. The corresponding container or housing is explosion-proof and is for example used for the assembly of clamps and of intrinsically safe and non-intrinsically safe circuits. The explosion protection is of protection class Ex-e or Ex-I, respectively. Materials for such housings are, for example, metals, in particular stainless steel, or resin material, in particular, polyester or glass fiber improved polyester.

The pivoting means of the known prior art comprises as first bolt, a joint upper part, and as a second bolt, a joint lower part. Those are pivotally connected to each other. The joint lower part or second bolt, respectively, is arranged in a housing wall and is slidable in a corresponding receiving bore and is moveable by the force of an elastic element.

The known housing allows, in a simple way, a close-by arrangement of housings and also a complete usage of the housing interior. A particular distance between such close-by arrangement of two housings or several housings is not necessary nor will the arrangement of the pivoting means reduce the housing interior in any particular way.

Corresponding advantages are also realized by the subject matter of the application. By the pre-known housing or container, a particular disadvantage has been found, in that for example for exchanging the lid part the complete housing or container has to be removed and that at another position as the assembly position then an exchange of the lid part can take place. Such an exchange of the lid part is for, example, necessary, if the explosion protection and/or particular denseness of the lid part in closed position relative to the lower part is no longer sufficiently guaranteed.

SUMMARY

It is an object of the present application, to improve a container described above in such a way that in a simple manner and without disassembly of the lower part of the container, an exchange of the lid part is possible.

This object is solved of the features of claim 1.

According to the invention the second bolt is inserted into a receiving sleeve, wherein the second bolt is supported in this receiving sleeve in longitudinal direction to be moveable between the corresponding inserted and extracted position. This means, the supporting in longitudinal direction of the second bolt is not directly realized by the lower part or the container, but directly by the receiving sleeve, which itself is releasably supported in the lower part in direction to the lid part. This means, the receiving sleeve may be released from the lower part without removing the lower part from its assembled position and with the receiving sleeve also the second bolt and with this also the first bolt and the complete pivoting means can be removed, which is fixed to the lid part by the first bolt.

In this way the advantages of the known housing or container remain, wherein however additionally a simple and inexpensive disassembly option for the cover part is provided.

In the simplest case and with as little need for space it is possible to arrange the receiving sleeve in the lower part, if a vertical boring open at least in direction to the lid part is provided in the wall of the lower part, in which boring the receiving sleeve can be arranged.

To allow in, a simple way, a releasable fixing of the receiving sleeve in such vertical boring, the receiving sleeve may have an outer threading and the vertical boring a complimentary internal thread for providing a mutual and releasable fixing.

To allow sliding of the second bolt within the receiving sleeve and to simultaneously prevent unintentional withdrawal of the second boring from the receiving sleeve, the receiving sleeve may comprise a limit stop in particular at a lower sleeve end which at least partially runs around the sleeve. This limit stop is in abutment with a corresponding counter stop of the second bolt in extracted position of the second bolt. This allows the second bolt to slide as far out of the receiving sleeve until it has assumed its maximum extracted position relative to the receiving sleeve. In this position the lid part is relatively wide open, such that the interior of the container is essentially and in a simple manner, completely accessible. Only in the inserted position of the second bolt a corresponding pivoting of the lid part to come into abutment with an upper edge of the lower part is possible in order to connect the lid part and lower part with each other.

It is possible that the corresponding circumferential limit stop of the receiving sleeve is a separate provided or arranged part. However, it is of advantage if, for example, the limit stop is formed by the lower end edge of the receiving sleeve. This means, at the lower end of the receiving sleeve a corresponding edge is formed, which is in contact with the corresponding counter stop in extracted position of the second bolt.

The counter stop is preferably a radially, outwardly protruding peripheral flange in particular at a lower bolt end of the second bolt. Also for this peripheral flange it is feasible that this does not have to run completely in a circumferential direction. Theoretically it is also feasible that only an outwardly extending protrusion is provided.

In order to enable, in a simple manner, a corresponding assignment of the second bolt to a pressure spring, the second bolt may have an open insertion boring at its lower bolt end, in which boring a pressure spring may be partly inserted. By this pressure spring the second bolt is at least slidable in its extracted position relative to the receiving sleeve, when the lid part is in its open position or is released from the lower part.

For supporting the pressure spring, it is also feasible in this respect that the pressure spring is supported at its lower spring end opposite to the insertion boring of the second bolt in the lower part. This can be executed for example by a lower and closed end of the vertical boring. To at least partially support the pressure spring, it is possible to assign a guiding bolt to the lower spring end, onto which guiding bolt the pressure spring is at least partially slid on. Thus, the pressure spring can still be supported by its lower spring end at the lower end of the vertical boring, wherein furthermore it is supported in its longitudinal direction on its lateral side by the guiding bolt.

In this connection it may furthermore prove to be advantageous, when the guiding bolt comprises an at least partially circumferential, radial, outwardly protruding abutment flange, which supports the lower spring end. In this way, a support of the pressure spring is possible independent of the vertical boring.

To allow an arrangement of the guiding bolt in the wall of the lower part in a simple and secure way, the guiding bolt may be thread with its lower end section in a thread-in boring in the wall of the lower part.

To allow, in a simple way, an arrangement of the guiding bolt in the wall and in the thread-in boring, it is possible to provide an outwardly open recess above the thread-in boring in the lower part for assembly/disassembly of the guiding bolt. The recess is generally laterally open, which means, that with the usage of this recess, the guiding bolt may be thread in with its corresponding lower end section in said thread-in boring. The thread-in boring runs generally coaxial to the vertical boring, wherein the corresponding laterally open recess can be arranged between the vertical boring and thread-in boring.

To allow gripping of the receiving sleeve for releasing or fixing same in the vertical boring, the receiving sleeve can comprise a circumferential annular gap adjacent to its upper sleeve end. This annular gap may, for example, be used for a screw-wrench or the like.

To allow defining our corresponding final thread-in position by the threading-in of the receiving sleeve in the vertical boring, the receiving sleeve may have, at its upper end section above the annular sleeve, an outer diameter larger in comparison to an outer diameter below the annular gap. To allow reduction of the construction height of the pivoting means, a second bolt may be slid on to the guiding bolt by its inserting boring. This means, in close position of the lid part and in inserted position of the second bolt there is a small construction height for the pivoting means.

According to the invention, the container is in particular designed such that the lid part can be disposed on the lower part in a formation of an explosion-protected container and can be releasably connected to same. This may be realized in such a way that a corresponding flame-proof gap is formed between lid part and lower part.

Different cross-sectional shapes for lid part and lower part are feasible, wherein in the simplest case and for a simple arrangement next to each other of several containers lid part and lower part have an essentially quadrangular cross section and corresponding pivoting means are provided in two neighboring corners of each lid part and lower part.

The simple determination of screw-in position of the receiving sleeve can be realized in such a way, that at an upper end of the vertical boring an abutment step is provided, on which for determination of the thread-in depth or position, respectively, the upper end section of the receiving sleeve can be put on.

BRIEF DESCRIPTION OF THE DRAWINGS

In the following, an advantageous embodiment of the invention is described with respect to the figures.

DETAILED DESCRIPTION OF EXAMPLE EMBODIMENTS

Figure 1:
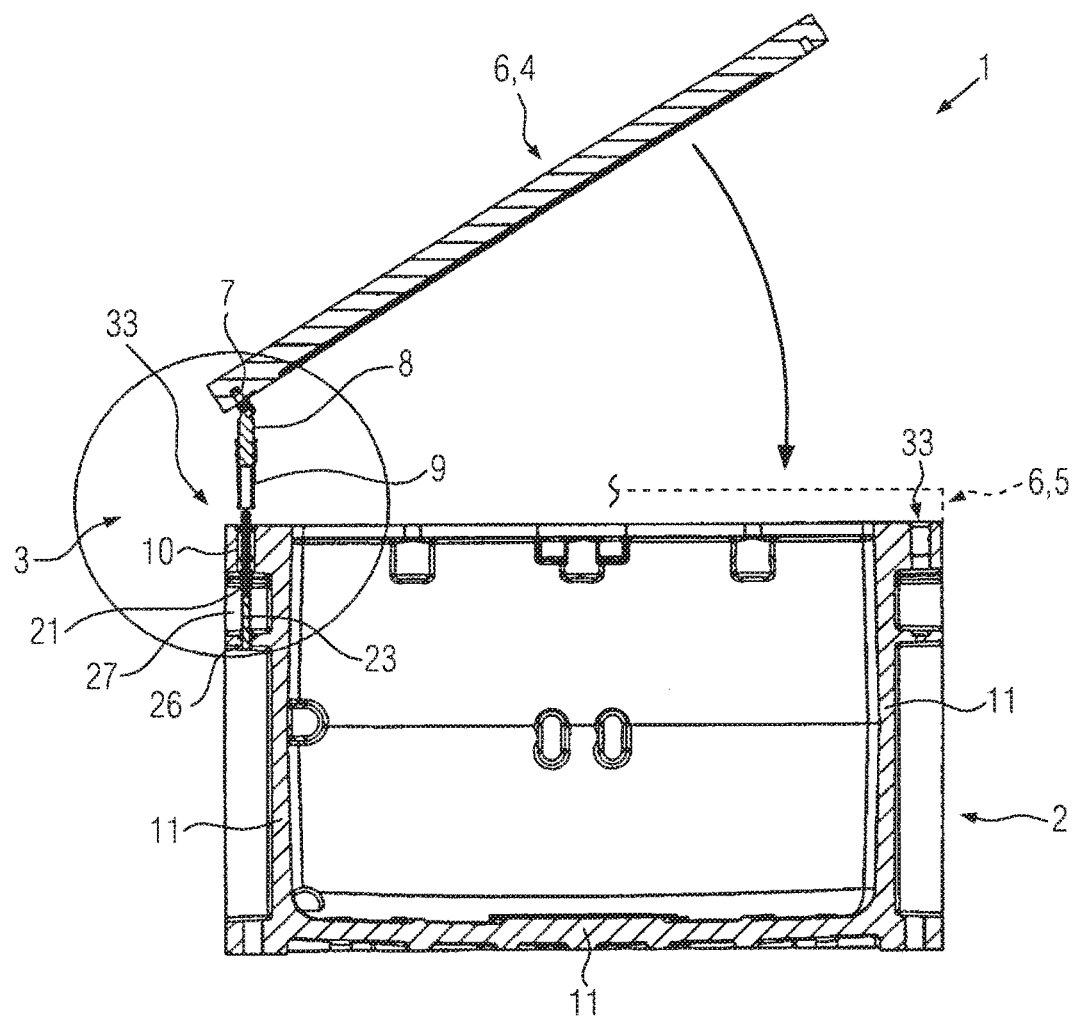
FIG. 1 shows a vertical sectional view of a container according to the invention.

FIG. 1 illustrates a vertical sectional view of one embodiment of container 1 according to the invention with pivoting means 3. Such a container generally has a quadrangular and in particular rectangular cross section. Such a cross section has four corners 33, wherein in each of these corners corresponding means for arranging the pivoting means 3 might be arranged. In this respect, it is sufficient when the pivoting means 3 is arranged in two neighboring corners depending on the opening direction of the lid part 6 relative to lower part 2. In FIG. 1 the lid part 6 is arranged in open position 4, wherein simultaneously in FIG. 1 only partly and with a dashed line a corresponding closed position 5 of the lid part 6 is illustrated.

In closed position 5 of the lid part 6 an explosion-protected container 1 is provided, wherein for example a corresponding flame-proof gap is formed between lid part and lower part.

Container 1 comprises a circumferential wall 11 with side walls and a bottom. The pivoting means 3 is illustrated in position already released from the lower part. According to the invention, it is possible in such a way that the lid part is simply removed from the lower part without disassembly of the lower part from its assembled position.

Figure 2:
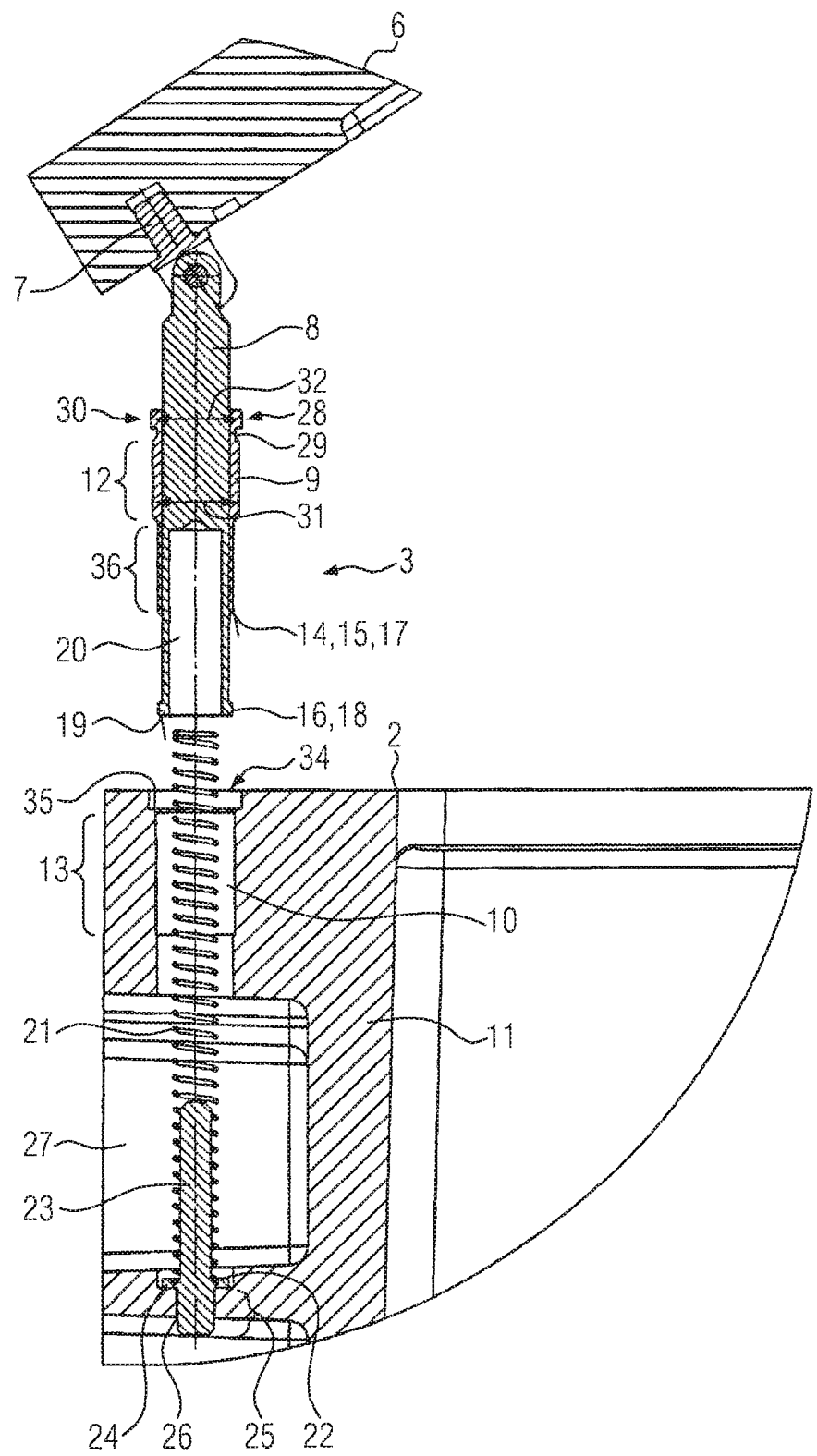
FIG. 2 shows an enlarged detail A of FIG. 1 for illustrating a pivoting means.

The pivoting means 3 will now be further discussed with respect to FIG. 2 which represents an enlarged view of detail A of FIG. 1.

The pivoting means 3 comprises a first bolt 7 and a second bolt 8. The first bolt 7 is fixed in a thread-in boring of the lid part 6. At its end protruding from the lid part 6 the first bolt 7 is pivotally connected with the second bolt 8. The second bolt extends in direction of a receiving sleeve 9, which forms a further part of the pivoting means 3. The receiving sleeve 9 is insertable together with the second bolt 8 in a corresponding vertical boring 10 provided in a corresponding corner 33 of lower part 2.

The insertion and in particular the fixing of the receiving sleeve of the vertical boring is possible by an outer threading 12 on the outer surface of the receiving sleeve 9 and by an inner threading 13 on an internal surface of the vertical boring 10. Above the region of the receiving sleeve with outer threading 12, an annular groove or annular gap 29 is arranged. This is used for gripping the receiving sleeve with a corresponding tool and to rotate the receiving sleeve in the vertical boring for releasing or fixing, respectively, of the receiving sleeve within the vertical boring.

Above the annular gap 29 the receiving sleeve 9 comprises an upper end section 30 at its upper sleeve end 28, which section has an outer diameter 32. This outer diameter is larger than a corresponding outer diameter 31 of the receiving sleeve, for example, below the annular gap 29. A lower end section 36 follows the section with outer threading of the vertical receiving sleeve 9, which lower section 36 has a smaller diameter as diameter 31. This lower end section 36 comprises a limit stop 15 at the lower sleeve end 14 in the form of an end edge 17. With this limit stop 15 a corresponding counter stop 16 at the second bolt is in abutment, when the second bolt 8 is arranged in the extracted position with the receiving sleeve 9 in its thread-in position with respect to the vertical boring 10. This means, the second bolt 8 may slide out of the receiving sleeve 9 until the counter stop 16 is in abutment with limit stop 15. The counter stop 16 is formed by an edge flange 18 which extends radially outwardly. Moreover, the second bolt 8 comprises an insertion boring 20 at its lower bolt end 19 and open in a downward direction. A pressure spring 21 is at least partially insertable into this boring, wherein in the closed position of the lid part 6 and in inserted position of the second bolt 8, a guiding bolt 23 is at least partially inserted into this insertion boring 20.

The vertical boring 10 has at its upper end 34 an enlarged diameter in the form of an abutment step 35, at which the upper end section 30 abuts when the receiving sleeve 9 is completely threaded into the vertical boring 10. In this way the thread-in depth or thread-in position of the receiving sleeve 9 is determined.

The corresponding outer diameter of the edge flange 18 at the lower bolt end 19 is adapted with respect to the inner diameter of the vertical boring 10, such that the edge flange 18 is slidable along the vertical boring 10 up to the area of an outwardly open recess 27 of wall 11 of the lower part 2. The sliding in this connection might be performed in such a way that at least in closing position of the lid part 6 and in inserted position of the second bolt 8, the guiding bolt 23 is at least partially inserted into the insertion boring 20.

The guiding bolt 23 is insertable through the laterally open recess 27 of wall 11. The insertion is possible by the threading of a lower end section 25 of the guiding bolt 23 into a corresponding thread-in boring 26. This boring co-axially extends with respect to the vertical boring 10. In a corresponding manner, the lower end section 25 of the guiding bolt 23 has an outer threading and the thread-in boring 26, an internal threading.

For further fixing of the guiding bolt 23 in the thread-in boring 26 and also for supporting a lower spring end 22, a radially outwardly protruding abutment flange 24 of the guiding bolt 23 is provided. This is arranged in a countersunk manner and above the thread-in boring 26 and in particular defines the thread-in position of the thread-in bolt 26. The pressure spring 21 is arranged on the part of the guiding bolt 23, protruding out of the thread-in boring 26, wherein the pressure spring 21 is supported at its lower spring end 22 on said abutment flange 24.

In FIG. 2, the corresponding parts of the pivoting means 3 are already released from each other, such that a removal of the lid part is possible in a simple way and without also removing the lower part from its assembled position. Only the receiving sleeve 9 is unscrewed out of the vertical boring 10, wherein this is possible without influencing the second bolt 8 which is slidably supported in the receiving sleeve. After release of the threading, the lid part 6 is liftable in an upward direction with respect to the lower part, together with the first bolt 7, second bolt 8, and receiving sleeve 9. It is also possible to take out pressure spring 21. For releasing the guiding bolt 23, the laterally open recess 27 of wall 11 is used. Through this recess it is possible to grasp the guiding bolt 23, such that this can be unscrewed out of the corresponding screw-in boring 26.

For inserting the receiving sleeve 9, the lid part 6 in FIG. 2 is moved downwards and in a corresponding insertion depth of the receiving sleeve 9, a screwing of outer thread 12 and inner thread 13 for fixing the receiving sleeve 9 in vertical boring 10, takes place. Simultaneously, the second bolt 8 is inserted into the vertical boring 10 and at least partially receives, via its lower insertion boring 20, the pressure spring 21.

A corresponding pivoting means 3 is arranged at two adjacent corners of a container 1 according to the invention. Lid part and lower part, however, might be prepared in each corner for the arrangement of a corresponding pivoting means 3, see also FIG. 1.

The invention claimed is:

1. A container comprising:
   a lower part that has sidewalls and a bottom wall that are configured to define a quadrangular cross-sectional profile;
   a lid part;
   a pivoting means for pivotally coupling the lid part to the lower part such that the lid part and the lower part are pivotable between a closed position and an open position, wherein the pivoting means comprises:
   a first bolt assigned to the lid part; and
   a second bolt assigned to the lower part and pivotally coupled to the first bolt,
   wherein the second bolt is slidably supported in a longitudinal direction in a receiving sleeve between an inserted position and an extracted position,
   wherein the receiving sleeve is releasably coupled to the lower part such that the lid part is removable from the lower part together with the first bolt, second bolt, and the receiving sleeve by releasing the receiving sleeve from the lower part, and
   wherein the receiving sleeve comprises, at a lower sleeve end, an at least partially circumferential limit stop, which in an extracted position of the second bolt is in abutment with a counter stop of the second bolt.

2. The container according to claim 1, wherein a vertical boring is formed in the sidewall of the lower part which is at least open in a direction towards the lid part, such that the receiving sleeve can be arranged in the vertical boring.

3. The container according to claim 2, wherein the receiving sleeve has an outer threading and the vertical boring has an inner threading for mutual releasable fixation.

4. The container according to claim 1, wherein the at least partially circumferential limit stop is formed by a lower end edge of the receiving sleeve.

5. The container according to claim 1, wherein the counter stop is formed as a radially outwardly protruding edge flange at a lower bolt end of the second bolt.

6. The container according to claim 1, wherein the second bolt comprises an insertion boring which is open from a lower bolt end, wherein a pressure spring can be inserted at least partially into the insertion boring.

7. The container according to claim 6, wherein the pressure spring is supported at a lower spring end opposite to the insertion boring in the lower part.

8. The container according to claim 7, wherein a guiding bolt is assigned to the lower spring end on which the pressure spring is at least partially shifted on.

9. The container according to claim 8, wherein the guiding bolt comprises an at least partially circumferential and radially outwardly protruding abutment flange, which supports the lower spring end.

10. The container according to claim 8, characterized in that the guiding bolt can be screwed in with a lower end region in a screw-in boring of a sidewall of the container.

11. The container according to claim 10, wherein an outwardly open recess is formed in a sidewall above the screw-in boring for assembly and disassembly of the guiding bolt.

12. The container according to claim 1, wherein the receiving sleeve comprises a circumferential annular gap adjacent to an upper sleeve end.

13. The container according to claim 12, wherein the receiving sleeve has an outer diameter in an upper end section above the annular gap which is larger in relation to an outer diameter below said annular gap.

14. The container according to claim 8, wherein the second bolt is slidable onto the guiding bolt by the insertion boring.

15. The container according to claim 1, wherein the lid part in the closed position is disposed on the lower part such that the lid part and the lower part form an explosion-protected container and the lid part is releasably connected to the lower part.

16. The container according to claim 1, wherein the pivoting means is provided in two adjacent corners of each lid part and lower part.

17. The container according to claim 2, wherein at an upper end of the vertical boring an abutment step is provided, on which an upper end section of the receiving sleeve is supported for defining a corresponding thread-in depth.

18. A container comprising:
a lower part that has sidewalls and a bottom wall that are configured to define a quadrangular cross-sectional profile;
a lid part;
a pivoting means for pivotally coupling the lid part to the lower part such that the lid part and the lower part are pivotable between a closed position and an open position, wherein the pivoting means comprises:
a first bolt assigned to the lid part; and
a second bolt assigned to the lower part and pivotally coupled to the first bolt,
wherein the second bolt is slidably supported in a longitudinal direction in a receiving sleeve between an inserted position and an extracted position,
wherein the receiving sleeve is releasably coupled to the lower part such that the lid part is removable from the lower part together with the first bolt, second bolt, and the receiving sleeve by releasing the receiving sleeve from the lower part, and
wherein the second bolt comprises an insertion boring which is open from a lower bolt end, wherein a pressure spring can be inserted at least partially into the insertion boring.

19. A container comprising:
a lower part that has sidewalls and a bottom wall that are configured to define a quadrangular cross-sectional profile;
a lid part;
a pivoting means for pivotally coupling the lid part to the lower part such that the lid part and the lower part are pivotable between a closed position and an open position, wherein the pivoting means comprises:
a first bolt assigned to the lid part; and
a second bolt assigned to the lower part and pivotally coupled to the first bolt,
wherein the second bolt is slidably supported in a longitudinal direction in a receiving sleeve between an inserted position and an extracted position,
wherein the receiving sleeve is releasably coupled to the lower part such that the lid part is removable from the lower part together with the first bolt, second bolt, and the receiving sleeve by releasing the receiving sleeve from the lower part,
wherein the receiving sleeve comprises a circumferential annular gap adjacent to an upper sleeve end, and
wherein the receiving sleeve has an outer diameter in an upper end section above the annular gap which is larger in relation to an outer diameter below said annular gap.

* * * * *